(12) United States Patent
Omer et al.

(10) Patent No.: US 10,846,721 B2
(45) Date of Patent: Nov. 24, 2020

(54) METHOD AND SYSTEM TO REDUCE FOOD WASTE AND CONTROL PRICES IN RETAIL

(71) Applicant: WasteLess LTD, Kfar Saba (IL)

(72) Inventors: Oded Omer, Holon (IL); Ben Biron, Kfar Saba (IL); Yossi Regev, Ramat Gan (IL)

(73) Assignee: WASTELESS LTD, Kfar Saba (IL)

(*) Notice: Subject to any disclaimer, the term of this patent is extended or adjusted under 35 U.S.C. 154(b) by 207 days.

(21) Appl. No.: 15/677,262

(22) Filed: Aug. 15, 2017

(65) Prior Publication Data
US 2019/0057409 A1   Feb. 21, 2019

(51) Int. Cl.
G06Q 30/02 (2012.01)
G06K 7/10 (2006.01)
G06K 7/14 (2006.01)

(52) U.S. Cl.
CPC ..... G06Q 30/0206 (2013.01); G06K 7/10237 (2013.01); G06K 7/1413 (2013.01); G06K 7/1417 (2013.01)

(58) Field of Classification Search
CPC ........... G06Q 30/0206; G06K 7/10237; G06K 7/1413; G06K 7/1417
USPC .................. 705/7.35, 14.38, 14.23, 26.8
See application file for complete search history.

(56) References Cited

U.S. PATENT DOCUMENTS

| | | | |
|---|---|---|---|
| 5,483,624 A | 1/1996 | Christopher et al. | |
| 6,007,759 A | 12/1999 | Ten Tije et al. | |
| 6,379,058 B1 | 4/2002 | Petteruti et al. | |
| 6,409,401 B1 | 6/2002 | Petteruti et al. | |
| 7,054,832 B1* | 5/2006 | Vallabh | G06Q 10/08 186/53 |
| 7,180,627 B2 | 2/2007 | Moylan et al. | |
| 2004/0210495 A1 | 10/2004 | White | |
| 2006/0221363 A1 | 10/2006 | Roth et al. | |
| 2006/0277109 A1 | 12/2006 | Kerth et al. | |
| 2007/0023516 A1 | 2/2007 | Chapman et al. | |
| 2012/0022947 A1* | 1/2012 | Esprey | G01G 19/4144 705/14.64 |
| 2012/0095823 A1* | 4/2012 | Tak | G06Q 10/087 705/14.38 |
| 2013/0138491 A1* | 5/2013 | Gao | G06Q 30/0225 705/14.23 |
| 2015/0174803 A1 | 6/2015 | Newman et al. | |
| 2015/0317667 A1* | 11/2015 | Wohlert | G06Q 30/0235 705/14.35 |

FOREIGN PATENT DOCUMENTS

| | | | | |
|---|---|---|---|---|
| JP | 2017502856 | 1/2017 | | |
| WO | WO-9612243 A1 * | 4/1996 | ........... | G07G 1/0045 |

OTHER PUBLICATIONS

Mattias Eriksson, Retail Food Wastage, 2012 (Year: 2012).*

(Continued)

*Primary Examiner* — Tarek Elchanti
(74) *Attorney, Agent, or Firm* — David Postolski, Esq.; Gearhart Law LLC

(57) ABSTRACT

Systems and methods are provided for determining a price of one or more goods. The method includes assigning a readable identification tag to a good, applying one or more price-calculation factors to the good, identifying the good associated with the identification tag, and calculating, using a processor, a price of the good according to the one or more price-calculation factors.

12 Claims, 2 Drawing Sheets

(56) References Cited

OTHER PUBLICATIONS

Breaking Exclusive: Wasteless Raises $400k Seed for 'Internet of Groceries' Technology [online]. Lauren Manning. [captured on May 17, 2017]. captured from <https://web.archive.org/web/20170517120735/https://agfundernews.com/breaking-exclusive-20 Apr 2017 (Apr. 20, 2017) the entire document.

Startup introduces 'Internet of Groceries' to push sales while reducing waste [online]..smartcitiesdive. [captured on May 14, 2017]. captured from <https://web.archive.org/web/20170514073635/https://www.smartcitiesdive.com/news/startup-introduces-internet-of-groceries-to-push-sales-while-reducing-was/441882>. smartcitiesdive May 14, 2017 (May 14, 2017) The entire document.

Wasteless Demo Day Pitch [online]. youtube. [captured on Aug. 4, 2017]. captured from <https://www.youtube.com/watch?v=72upLDfueUA>. Aug. 4, 2017 (Aug. 4, 2017) The entire document.

* cited by examiner

METHOD AND SYSTEM TO REDUCE FOOD WASTE AND CONTROL PRICES IN RETAIL

CLAIM OF PRIORITY

This application is a United States non-provisional application and claims no priority to any previous United States patent application.

FIELD OF THE EMBODIMENTS

This invention relates to price calculation of goods and, in particular, to dynamic pricing of goods according to one or more price-calculation factors.

BACKGROUND OF THE EMBODIMENTS

Food spoilage is a major problem in the grocery industry. Billions of dollars of merchandise is lost every year to do expired food not being sold. Given the choice to pay the same price for goods having longer shelf lives and goods about to expire, consumers are less likely to purchase the goods about to expire. This results in many items not getting sold, leading to many items being thrown away.

Therefore, a method of dynamic pricing for grocery items is needed to help increase sales and reduce waste.

Examples of related art are described below:

U.S. Pat. No. 5,483,624 generally describes a hand held labeler is programmable to operate in accordance with a sequence of commands forming an application program that is downloaded to the labeler and stored in a random access memory. Each command is associated with a command routine selected from a set of command routines that is stored in a read only memory. The commands of the application program and associated command routines are executed by a microprocessor of the labeler to perform flexible data collection, data manipulation and label printing operations.

U.S. Patent Publication No. 2007/0075832 generally describes a user-programmable (UP) component for an RFID reader. The UP component facilitates reading an RFID tag and interfacing to I/O that functions as a validation mechanism that the read operation has occurred. The UP component facilitates application of the reader to new and/or different systems and products. The UP component can be a separate external device or module that interfaces to the RFID reader, or can be integrated into the reader for operation therein.

U.S. Patent Publication No. 2007/0023516 generally describes an RFID tag is pre-programmed with information about an object or device used in an RFID printer system. The RFID printer system can then read this information and take the appropriate action, such as user notification or printer parameter adjustment, to improve printer performance. The RFID tag can contain information about and be attached to printer elements, such as an RFID label or roll of labels, a print head, or a printer ribbon.

None of the art described above addresses all of the issues that the present invention does.

SUMMARY OF THE EMBODIMENTS

According to an aspect of the present invention, a method is provided for determining a price of one or more goods. The method includes assigning a readable identification tag to a good, applying one or more price-calculation factors to the good, identifying the good associated with the identification tag, and calculating, using a processor, a price of the good according to the one or more price-calculation factors.

According to another aspect of the present invention, a system is provided for determining a price of one or more goods. The system includes a server, the server including a processor and a memory, the memory being configured to store one or more price-calculation factors assigned to a good. The system further includes a readable identification tag coupled to the good and assigned to the good, and an identification tag scanner, coupled to the server, configured to scan the identification tag and access data stored on the server, wherein the processor is configured to identify the good associated with the identification tag scanned using the identification tag scanner and calculate a price of the good according to the one or more price-calculation factors.

It is an object of the present invention to provide the method for determining a price of one or more goods, wherein the readable identification tag is selected from the group consisting of: a Radio-Frequency Identification (RFID) tag; a barcode; and a matrix barcode.

It is an object of the present invention to provide the method for determining a price of one or more goods, wherein the price-calculation factors are selected from the group consisting of an expiration date of the good, a quantity of similar goods, a sale strength of a brand of goods, a catalog price listed for the good, a predetermined minimum price allowed for the good, a demographic area in which the good is sold, a day of the week in which the good is sold, an hour of the day in which the good is sold, a demand curve for the good, whether the good is discounted, whether the good is packaged, whether the good has any competitors, the last price that was charged for the good, whether there is an active advertising campaign for the good, and a price history of the good.

It is an object of the present invention to provide the method for determining a price of one or more goods, wherein the processor is coupled to a server configured to store data associated with the good.

It is an object of the present invention to provide the method for determining a price of one or more goods, wherein an identification tag scanner is coupled to the server.

It is an object of the present invention to provide the method for determining a price of one or more goods, wherein the method further includes returning the calculated price to a consumer.

It is an object of the present invention to provide the method for determining a price of one or more goods, wherein the method further includes displaying, on a display, an exact price of the good.

It is an object of the present invention to provide the system for determining a price of one or more goods, wherein the readable identification tag is selected from the group consisting of a Radio-Frequency Identification (RFID) tag; a barcode; and a matrix barcode It is an object of the present invention to provide the system for determining a price of one or more goods, wherein the price-calculation factors are selected from the group consisting of an expiration date of the good, a quantity of similar goods, a sale strength of a brand of goods, a catalog price listed for the good, a predetermined minimum price allowed for the good, a demographic area in which the good is sold, a day of the week in which the good is sold, an hour of the day in which the good is sold, a demand curve for the good, whether the good is discounted, whether the good is packaged, whether the good has any competitors, the last price that was charged for the good, whether there is an active advertising campaign for the good, and a price history of the good.

It is an object of the present invention to provide the system for determining a price of one or more goods, wherein the server is further configured to return the calculated price to a consumer.

It is an object of the present invention to provide the system for determining a price of one or more goods, wherein the system further includes a display coupled to the server using a wired or wireless connection.

It is an object of the present invention to provide the system for determining a price of one or more goods, wherein the display is configured to display an exact price of the good.

DESCRIPTION OF THE PREFERRED EMBODIMENTS

Figure 1:
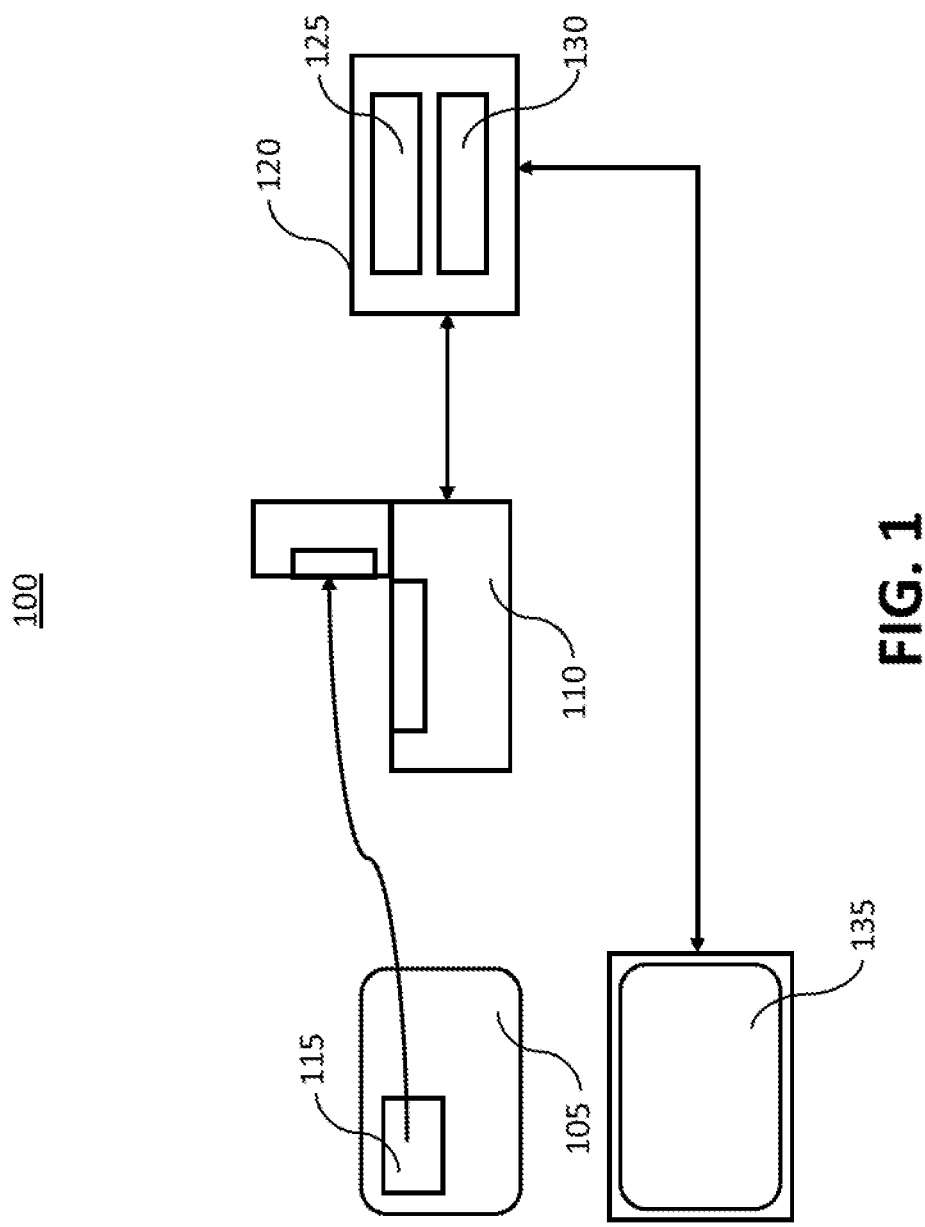
FIG. 1 shows a system for analyzing and determining the price of goods, according to an embodiment of the present invention.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

Referring now to FIG. 1, a system 100 for analyzing and determining the price of goods 105 is illustratively depicted, in accordance with an embodiment of the present invention.

According to an embodiment, the system 100 includes one or more goods 105, a scanner 110 for scanning an identifiable tag 115 on the one or more goods 105, and a server 120. According to an embodiment, the server 120 includes a processor 125 and a memory 130. According to an embodiment, the memory 130 is configured to store identifiable information and/or price-calculation factors about the one or more goods 105. According to an embodiment, the processor 125 is configured to perform one or more of the steps described in method 200 of FIG. 2.

Various price-calculation factors may be associated with particular goods 105. These price-calculation factors may be interpreted by the server 120 to determine a purchase price of the goods 105. For example, according to an embodiment, the expiration date (and/or any other price-calculating factors) of the good may be input into the server 120. According to an embodiment, the closer the sale date is to the date of expiration, the lower the price for the goods.

According to an embodiment, the server 120 stores information related to various goods 105. A user may scan the goods 105, wherein a tag 115 located on the goods 105 is scanned using the scanner 110, wherein the scanner 110 is configured to scan the tag 115 associated with the goods 105. The scanner 110 accesses information associated with the goods 105 (which includes, e.g., price-calculating factors), communicates this information with the server 120 and, based on this information, the server 120 calculates the price of the goods 105. This price is then presented to a consumer.

According to an embodiment, the system 100 further includes a display 135 that is configured to display the current prices for the goods 105, dependent on various price-calculation factors. For example, the display 135 may show the approximate price of the goods according to the expiration date and more factors, of any particular good 105.

The scanner 110 and/or the display 135 may be coupled to the server 120 through a wired and/or wireless connection, such as, e.g., local WiFi, the cloud.

Figure 2:
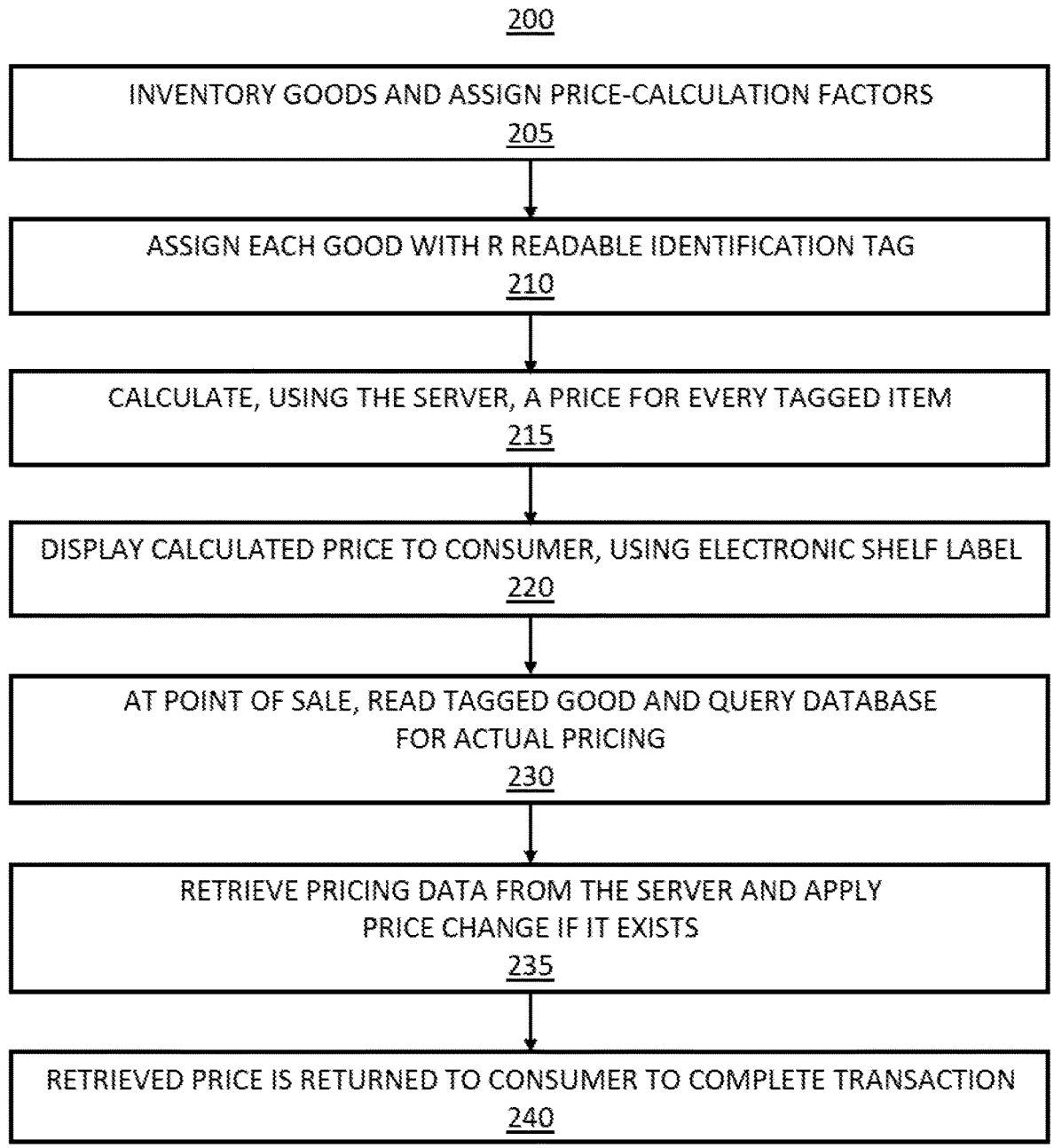
FIG. 2 shows a method for analyzing and determining the price of goods, according to an embodiment of the present invention.

Referring now to FIG. 2, a method 200 for analyzing and determining the price of goods 105 is illustratively depicted, in accordance with an embodiment of the present invention.

At step 205, goods 105 are inventoried and assigned one or more price-calculation factors. These factors are stored in the memory 130 of the server 120.

According to an embodiment, there are a number of price-calculation factors that are used to determine the price of goods at the time of sale. These price-calculation factors may include, but are not limited to, the expiration date of the goods, the quantity of a particular good in the, the quantity of similar items from same or different seller, seller's inventory, the sale strength of the brand of goods, the catalog price listed for the goods, a predetermined minimum price allowed for a particular good, the demographic area in which particular goods are sold, the day of the week in which the goods are sold, the hour of the day, any particularly significant days of sale (such as, e.g., holidays, days in which major events are taking place, etc.), the hour of the day in which the goods are sold, the stock protection of the goods, the demand curve for particular goods, the sale elasticity factors for particular goods, whether certain goods are otherwise already discounted, whether the goods are packaged (and/or what type of packaging), the packaged quantity of particular goods, whether the good has any competitors, the last price that was charged for the goods, any rounding rules applicable for particular goods, whether there is an active advertising campaign for particular goods, the shelf state for particular goods, the price history of particular goods, and/or any other relevant price-calculation factors. According to an embodiment, any or all of the price-calculation factors may be used for a particular good.

According to an embodiment, the price-calculation factors are continuously analyzed and/or assigned for one or more goods.

At step 210, each particular good is assigned a readable identification tag 115 such that a scanner 110, upon reading the tag 115 is able to access the information associated with that particular good 105. The tag 115 may be a Radio-Frequency Identification (RFID) tag, a barcode, a matrix barcode, and/or any other suitable method for identifying a product.

At step 215, the server 120, based on the information associated with a particular good 105, calculates a price of the good 105. According to an embodiment, the price of the goods 105 is automatically calculated by the server 120 at the time of sale. According to an embodiment, there is a minimum price that can be charged for particular goods 105. The price for those particular goods 105 cannot be decreased below that minimum price, independent of the price-calculation factors.

At step 220, the approximate price for the goods is displayed to the consumer prior to the point of sale. According to an embodiment, the server 120 periodically and/or continuously updates the price of goods 105 and displays the current price of those goods 105 on a display 135 that is coupled to the server 120. According to an embodiment, the display 135 is an electronic shelf label.

According to another embodiment, the goods 105 are scanned by the scanner 110. Upon scanning the tag 115, the scanner 120, at step 220, is able to access relevant information on the goods 105. This information may include, but is not limited to, the price-calculation factors, the name of the goods 105, the location of the goods, and/or any other relevant information. It is noted, however, that the scanning need not be performed according to every embodiment of the present invention.

At step 230, at the point of sale, the tag 115 of the tagged good 105 is scanned, using the scanner 120, and the database of the server 120, housing information on the tagged goods 105, is queried for the actual pricing of the tagged good 105. At step 235, the price is retrieved and, at step 240, is returned to the consumer to complete the sale, wherein the price calculated by the server 120 is then charged to the consumer.

It is noted that the various steps described herein may be performed in any order and that all of the steps need not be performed according to every aspect of the present invention.

This method may be used for any type of goods for which price-calculation factors may be assigned. For example, this method may be used in the field of grocery shopping. In this particular field, the present system 100 and method 200 may facilitate the sale of grocery store goods, eliminating some of the waste associated with that type of establishment.

When introducing elements of the present disclosure or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A method for determining and modifying a price of one or more goods to reduce food waste, the method comprising:
dynamically accessing, by a processor of a first server in real-time, one or more price-calculation factors associated with a shelf state of a good and the one or more price-calculation factors associated with a future stock of the good, wherein the one or more price-calculation factors comprise a presence or an absence of an active advertising campaign for the good, a quantity of the good, a quantity of similar goods from a competitor, a quantity of the good per expiration date, a quantity of the similar goods from the competitor per expiration date, and at least another factor of the one or more price-calculation factors associated with the good and stored in a memory, the memory being coupled to the processor of the first server;
dynamically calculating, by the processor of the first server in real-time, a price of the good based on the one or more price-calculation factors associated with the shelf state of the good and the one or more price-calculation factors associated with the future stock of the good, wherein a first price of the good determined during a first time period is equal or greater than a second price of the good determined during a second time period since the second time period is closer to the expiration date of the good than the first time period;
storing the price of the good in the memory of the first server; and
transmitting, via the first server, the price of the good to a second server; and
during checkout,
scanning, by an identification tag scanner coupled to the second server, a readable identification tag coupled to the good and assigned to the good;
accessing, by a processor of the second server, information associated with the readable identification tag stored in a memory of the second server; and
determining, by the processor of the second server, an identity of the good associated with the readable identification tag and its current price.

2. The method as recited in claim 1, wherein the readable identification tag is selected from the group consisting of a Radio-Frequency Identification (RFID) tag; a barcode; and a matrix barcode.

3. The method as recited in claim 1, wherein the at least another factor of the one or more price-calculation factors includes: a quantity of similar goods from a same seller of the good; an inventory of the good associated with the seller of the good; a sale strength of a brand of goods; a catalog price listed for the good; a predetermined minimum price allowed for the good; a demographic area in which the good is sold; a day of the week in which the good is sold; an hour of the day in which the good is sold; sale elasticity factors for the good; a demand curve for the good; whether the good is discounted; whether the good is packaged; what type of packaging the good has; a packaged quantity of the good; whether the good has any competitors; the last price that was charged for the good; and a price history of the good.

4. The method as recited in claim 1, further comprising: returning the calculated price to a consumer in real-time.

5. The method as recited in claim 1, further comprising; displaying, on a display coupled to the second server, an approximate price of the good in real-time.

6. A system for determining and modifying a price of one or more goods to reduce food waste, the system comprising:
a first server comprising:
a processor; and
a memory coupled to the processor, wherein the memory is configured to store one or more price-calculation factors associated with a shelf state of a good and the one or more price-calculation factors associated with a future stock of the good, wherein the one or more price-calculation factors comprise a presence or an absence of an active advertising campaign for the good, a quantity of the good, a quantity of similar goods from a competitor, a quantity of the good per expiration date, a quantity of the similar goods from the competitor per expiration date, and at least another factor of the one or more price-calculation factors associated with the good;
the processor being configured to:
dynamically access the one or more price-calculation factors associated with the shelf state of the good and the one or more price-calculation factors associated with the future stock of the good in real-time; and
dynamically calculate a price of the good according to the one or more price-calculation factors associated with the shelf state of the good and the one or more price-calculation factors associated with the future stock of the good, wherein a first price of the good determined during a first time period is equal or greater than a second price of the good determined during a second time period since the second time period is closer to the expiration date of the good than the first time period;

the memory being configured to store the price of the good; and the processor being configured to transmit the price of the good to a second server; and an identification tag scanner coupled to the second server and another processor and configured to, during check-out:

scan a readable identification tag coupled to the good and assigned to the good;

access information associated with the readable identification tag and stored in the memory; and determine an identity of the good associated with the readable identification tag and its current price.

7. The system as recited in claim 6, wherein the readable identification tag is selected from the group consisting of a Radio-Frequency Identification (RFID) tag; a barcode; and a matrix barcode.

8. The system as recited in claim 6, wherein the at least another factor of the one or more price-calculation factors includes: a quantity of similar goods from a same seller of the good; an inventory of the good associated with the seller of the good; a sale strength of a brand of goods; a catalog price listed for the good; a predetermined minimum price allowed for the good; a demographic area in which the good is sold; a day of the week in which the good is sold; an hour of the day in which the good is sold; a demand curve for the good; sale elasticity factors for the good; whether the good is discounted; whether the good is packaged; what type of packaging the good has; a packaged quantity of the good; whether the good has any competitors; the last price that was charged for the good; and a price history of the good.

9. The system as recited in claim 6, wherein the second server is further configured to return the calculated price to a consumer in real-time.

10. The system as recited in claim 6, further comprising: a display coupled to the second server.

11. The system as recited in claim 10, wherein the display is configured to display an approximate price of the good in real-time.

12. The system as recited in claim 6, wherein the system utilizes a singular server.

* * * * *